United States Patent [19]
Tsuchida et al.

[11] 3,893,888
[45] July 8, 1975

[54] FERMENTATIVE PRODUCTION OF L-VALINE

[75] Inventors: Takayasu Tsuchida, Kawasaki; Fumihiro Yoshinaga, Fujisawa, both of Japan

[73] Assignee: Ajinomoto Co., Inc., Tokyo, Japan

[22] Filed: Mar. 1, 1974

[21] Appl. No.: 447,379

[30] Foreign Application Priority Data
Mar. 9, 1973  Japan.................................. 48-27738

[52] U.S. Cl. ...................... 195/29; 195/28; 195/30; 195/47
[51] Int. Cl............................................ C12d 13/06

[58] Field of Search .................... 195/28, 29, 30, 47

[56] References Cited
UNITED STATES PATENTS
3,833,473  9/1974  Kubota et al. ........................ 195/29

Primary Examiner—A. Louis Monacell
Assistant Examiner—Robert J. Warden
Attorney, Agent, or Firm—Hans Berman; Kurt Kelman

[57] ABSTRACT

Mutant strains of the genera Brevibacterium and Corynebacterium having a resistance to 2-thiazolalanine or having said resistance together with a nutrient requirement, produce L-valine in a culture medium.

5 Claims, No Drawings

FERMENTATIVE PRODUCTION OF L-VALINE

The present invention relates to a method of producing L-valine by bacterial fermentation.

An object of the present invention is to produce L-valine at a low cost from readily available raw materials by using new type of microorganism. L-Valine in one of the essential amino acids for human and animal nutrition, and a wide use thereof is expected for example, enrichment of food, preparation of a seasoning and medical use. Proposals have been made for producing L-valine by a fermentative method employing a certain kind of nutrient requiring mutant strain. However, it was impossible to produce a large amount of L-valine by employing such a nutrient requiring mutant strain.

We have now found that some bacteria having a resistance to 2-thiazolalanine (hereinafter abbreviated as 2-TA) produce a large amount of L-valine when cultured in a nutrient medium. We have also found that a mutant strain having a resistance to 2-TA together with a certain nutrient requirement has a better ability to produce L-valine than a strain having only resistance to 2-TA or having only a certain nutrient requirement.

A microorganism employed in the present method is a strain belonging to genera Brevibacterium and Corynebacterium which resists growth inhibition by 2-TA. The microorganism may also have a nutrient-requirement and/or resistance to other reagents in addition to the resistance to 2-TA. The required nutrient may be leucine, isoleucine, threonine, or isoleucine and methionine, and the other reagents $\alpha$-amino-$\beta$-hydroxy valeric acid and ethionine.

Representative strains useful for the present invention are as follows:

1. 2-TA resistant mutants such as Corynebacterium glutamicum FERM P-1768 whose parent strain is Corynebacterium glutamicum (Micrococcus glutamicus) ATCC13032, Corynebacterium acetoacidophilum FERM P-1314 whose parent strain is Corynebacterium acetoacidophilum ATCC 13870 and Brevibacterium lactofermentum FERMP-1945 whose parent strain is Brevibacterium lactofermentum ATCC 13869.

2. Mutants having nutrient requirement in addition to 2-TA resistance such as Corynebacterium glutamicum FERMP-1967 (leucine requiring mutant), FERMP-1968 (threonine requiring mutant) and FERMP-1966 (isoleucine requiring mutant) which were obtained by a conventional artificial mutant inducing method from Corynebacterium glutanicum FERMP-1768 (2-TA resistant mutant), Brevibacterium lactofermentum FERMP-1964 (leucine requiring mutant), FERMP-1963 (isoleucine requiring mutant) and FERMP-1965 (threonine requiring mutant) which were obtained by a conventional artificial mutant inducing method from Brevibacterium lactofermentum FERMP-1945 (2-TA resistant mutant), and Brevibacterium lactofermentum FERMP-1845 (isoleucine plus methionine requiring mutant having resistance to 2-TA) which were induced from Brevibacterium lactofermentum FERMP-1858 (isoleucine plus methionine requiring mutant).

These mutant strains have the same morphological characteristics as their parent strains respectively. The morphological characteristics of Corynebacterium glutamicum ATCC 13032 are described in U.K. Patent No. 839,597, and those of Corynebacterium acetoacidophilum 13870 and Brevibacterium lactofermentum ATCC 13869 are described in U.S. Pat. No. 3,117,915. Specimen cultures of microorganisms identified by FERMP-number are freely available to qualified persons from the Fermentation Research Institute, Agency of Industrial Science of Technology, the Ministry and Industrial Trade and Industry, at 1-8-5, Inage Higashi, Chiba-shi, Chiba, Japan.

The method of obtaining mutant strains employed in the present invention is a conventional artificial mutant inducing method, and is illustrated, for example, by the following Experiment 1. The growth inhibition effect of 2-TA on a mutant having resistance to 2-TA and on its parent strain, was also examined as shown in the following Experiment 2.

EXPERIMENT 1

A culture medium containing 1 % yeast extract, 1 % pepton, 0.5 % NaCl and 0.5 % glucose, of pH 7.0 was prepared, and 5 ml batches of the medium were placed in test tubes and sterilized. Brevibacterium lactofermentum FERMP-1858 having requirements for methionine and isoleucine, which was obtained by a conventional mutant inducing method, for example a replica method, from parent strain Brevibacterium lactofermentum ATCC 13869, was inoculated on the medium and cultured at 31°C for 16 hours.

Microbial cells harvested from the cultured broth were added into 5 ml of phosphate-buffer containing 250 $\mu$g/ml of nitrosoguanidine, and the buffer solution with the cells was maintained at 31°C for 30 minutes under shaking. Thereafter, the microbial cells were harvested and washed twice with phosphate buffer solution.

The microbial cells treated as mentioned above were inoculated on an agar plate shown hereunder, and were cultured at 31°C for 2 days.

| Composition of a medium: | | |
|---|---|---|
| glucose | 2 | % |
| $(NH_4)_2SO_4$ | 1 | " |
| $KH_2PO_4$ | 0.1 | " |
| $MgSO_4\cdot 7H_2O$ | 0.04 | " |
| $Fe^{++}$ | 2 | ppm |
| $Mn^{++}$ | 2 | " |
| biotin | 50 | $\mu$g/l |
| thiamine·HCl | 100 | " |
| urea (sterilized separately) | 0.5 | % |
| L-isoleucine | 15 | mg/dl |
| DL-methionine | 30 | " |
| 2-thiazolalanine | 0.3 | % |
| (pH 7.0) | | |

The 2-TA resistant strains appearing on the agar plate were isolated. Brevibacterium lactofermentum FERMP-1845 was isolated from said resistant strains by examining their ability for producing L-valine.

Other mutant strains specified herebefore by FERMP-numbers were also obtained by the same method from the respective parent strains.

EXPERIMENT 2

Brevibacterium lactofermentum FERMP-1845 and its parent strain Brevibacterium lactofermentum FERMP-1858 which were previously cultured at 31°C for 24 hours on nutrient agar slants containing 1 % yeast extract, 1 % pepton, 0.5 % NaCl and 0.5 % glucose, were each suspended in a small amount of the following basal medium.

0.1 Ml of the suspension were added to 3 ml batches of the basal medium to which 2-TA was added in an amount shown in Table 1, and cultivation was carried out at 30°C for 24 hours with shaking.

| Basal medium: | | |
|---|---|---|
| glucose | 2 | % |
| urea | 0.2 | " |
| $(NH_4)_2SO_4$ | 0.15 | " |
| $KH_2PO_4$ | 0.1 | " |
| $K_2HPO_4$ | 0.3 | " |
| $MgSO_4 \cdot 7H_2O$ | 0.01 | " |
| $Fe^{++}$ | 2 | ppm |
| $Mn^{++}$ | 2 | " |
| biotin | 50 | µg/l |
| thiamine·HCl | 100 | " |
| L-isoleucine | 15 | mg/dl |
| DL-methionine | 30 | " |
| (pH 7.0) | | |

The concentration of the microbial cells in the suspension used for inoculation was 0.078 for the strain FERMP-1845 and 0.088 for the strain FERMP-1858 when specific optical density of solution prepared by diluting said supension to 26 times its initial volume was determined by measuring light absorbency at 562 mµ.

The resulting relative growth (which shows the degree of resistance) of each strain in the media containing different amounts of 2-TA are shown in the following Table 1.

Table 1

| Conc. of 2-TA | Relative growth | |
|---|---|---|
| (γ/ml) | FERMP-1845 | FERMP-1858 |
| 0 | 100 | 100 |
| 250 | 99 | 65 |
| 500 | 100 | 25 |
| 1000 | 100 | 0 |
| 1500 | 98 | 0 |
| 2000 | 85 | 0 |

As is apparent from Table 1, the growth of Brevibacterium lactofermentum FERMP-1858 was inhibited by addition of 2-TA, the growth of Brevibacterium lactofermentum FERMP-1845 in a medium containing 2,000 γ/ml of 2-TA was almost the same as in a medium without 2-TA.

The mutant strain FERMP-1845 was found to grow even in a medium containing 5,000 γ/ml of 2-TA.

The artificial mutants of Corynebacterium glutamicum were induced as in Experiment 1, and the growth of the mutants in a medium containing 2-TA was studied by the same way shown in Experiment 2.

Corynebacterium glutamicum FERMP-1768 having a resistance to 2-TA was induced from Corynebacterium glutamicum ATCC 13032 by the method disclosed in Experiment 1. Cells of the strain FERMP-1768 were harvested after cultivation and were added to phosphate-buffer containing 250 µg/ml of nitrosoguanidine. The solution was maintained at 30°C for 20 minutes under shaking. After said microbial cells were washed twice with the phosphate buffer solution, nutrient requiring mutants were obtained by usual replica method. We could obtain many mutant strains having a nutrient requirement together with resistance to 2-TA. Those mutant strains include Corynebacterium glutamicum FERMP-1967 (leu⁻), Corynebacterium glutamicum FERMP-1966 (isoleu⁻) and Corynebacterium glutamicum FERMP-1968 (thr⁻).

The growth inhibition of Corynebacterium glutamicum FERMP-1768 by 2-TA was examined as in Experiment 2. The relative growth of the parent strain, Corynebacterium glutamicum ATCC 13032, in a medium containing 1,000 γ/ml of 2-TA became zero, and while the relative growth of Corynebacterium glutamicum FERMP-1768 in a medium containing 2,000 γ/ml of 2-TA was more than 80 % and the strain could grow even in a medium containing 5,000 γ/ml of 2-TA.

The culture medium used to produce L-valine in the present invention may be entirely conventional. It should include an assimilable carbon source, an assimilable nitrogen source, and the usual minor nutrients. Examples of the carbon source are carbohydrates such as glucose, maltose, fructose, starch, starch hydrolyzate, cellulose hydrolyzate or molasses, organic acids such as acetic acid, propionic acid or succinic acid, alcohols such as ethanol or glycerol, and hydrocarbons such as n-paraffin. These substances may be used either singly or in mixtures of two or more. Useful nitrogen sources include ammonium sulfate, urea, ammonium nitrate, ammonium phosphate, ammonium chloride or gaseous ammonia. Inorganic salts, such as phosphate, magnesium, calcium, ferrous, manganese and other minor metallic salts are generally present. For the nutrient requiring mutants, the nutrients required should be present. Amino acids, vitamins, soy-bean hydrolyzate, yeast extracts, peptone and caseine hydrolyzate are preferably present for good bacterial growth.

The conditions for cultivation are quite conventional. The fermentation of the present invention is performed at a pH between 5 and 9, at a temperature of 20°C to 40°C under aerobic conditions for 1 to 4 days. The pH of the culture medium can be adjusted by adding sterile calcium carbonate, aqueous or gaseous ammonia, mineral acid or organic acid during the fermentation.

The L-valine is recovered from the cultured broth by conventional methods. L-valine produced by the present method was identified by paper chromatography, electrophoresis, and response to microbioassay as well as by comparision with an authentic sample.

The amount of L-valine produced in cultured broth was determined by microbioassay.

The following Examples are illustrative of the method of the present invention.

EXAMPLE 1

A culture medium whose composition is shown hereunder was prepared, and 20 ml batches of the medium were each placed in a 500 ml shaking flask.

| Composition of the medium: | | |
|---|---|---|
| glucose | 10 | % |
| $(NH_4)_2SO_4$ | 4 | " |
| $KH_2PO_4$ | 0.1 | " |
| $MgSO_4 \cdot 7H_2O$ | 0.04 | " |
| $Fe^{++}$ | 2 | ppm |
| $Mn^{++}$ | 2 | " |
| biotin | 50 | γ/l |
| thiamine HCl | 300 | " |
| soy bean protein hydrolyzate | 1 | ml/dl |
| $CaCO_3$ (sterilized separately) | 5 | % |
| (pH 7.0 adjusted by KOH) | | |

The eight of strains shown in Table 2, which had previously been cultured on respective bouillon slants at 30°C for 24 hours, were introduced respectively into each medium supplemented with a required amino acid in an amount shown in Table 2, and cultivation was carried out at 31.5°C for 72 hours. L-Valine produced in each cultured broth was determined by bioassay and shown in the following Table 2.

Table 2

| Strains employed* | | Amino acids required | | L-valine produced (g/dl) |
|---|---|---|---|---|
| | | Amino acid | Amount (mg/dl) | |
| Brevi. lactofermentum. FERMP-1945 | | — | — | 1.50 |
| " | 1963 | isoleucine | 15 | 2.51 |
| " | 1964 | leucine | 30 | 2.05 |
| " | 1965 | threonine | 30 | 1.96 |
| Coryne. glutamicum FERMP-1768 | | — | — | 1.20 |
| " | 1966 | isoleucine | 15 | 2.30 |
| 41 | 1967 | leucine | 30 | 1.70 |
| " | 1968 | threonine | 30 | 1.51 |

Note: *All strains a have a resistance to 2-TA.

One liter each of the broth of the strain FERMP-1964 and strain FERMP-1966 was centrifuged to remove bacterial cells, each supernatant was passed through a column packed with a cation exchange resin, and after washing with water, L-valine was eluted.

From, the From 9.3 g and 11.2 g of crystalline L-valine were recovered.

EXAMPLE 2

20 ml batches of the fermentation medium shown hereunder were each placed in a 500 ml shaking flask, and sterilized. The medium was inoculated with Brevibacterium lactofermentum FERMP-1845 (2-TA$^γ$, isoleu$^-$ plus met$^-$) which had previously been cultured on a bouillon slant at 30°C for 24 hours, and cultured at 30°C for 72 hours with stirring and aerating. The cultured broth was found to contain 2.38 g/dl of L-valine. As a control, Brevibacterium lactofermentum FERMP-1858 (isoleu$^-$ plus met$^-$) having no resistance to 2-TA was cultured by the same way mentioned above, and 0.9 g/dl of L-valine was found in the broth after 72 hours' cultivation, the mutant strain FERM P-1845 having produced more than twice as much valine.

| Composition of the medium: | | |
|---|---|---|
| glucose | 8 | % |
| (NH$_4$)$_2$SO$_4$ | 4 | " |
| KH$_2$PO$_4$ | 0.1 | " |
| MgSO$_4$·7H$_2$O | 0.04 | " |
| biotin | 50 | γ/l |
| thiamine HCl | 300 | " |
| Fe$^{++}$ | 2 | ppm |
| Mn$^{++}$ | 2 | " |
| L-isoleucine | 20 | mg/dl |
| DL-methionine | 40 | " |
| CaCO$_3$ (sterilized separately) (pH 7.0) | 5 | % |

What we claim is:
1. A method of producing L-valine by fermentation which comprises:
   a. culturing a microorganism of the genera Brevibacterium or Corynebacterium on a nutrient medium under aerobic conditions,
      1. said microorganism being capable of producing extracellular L-valine in said medium,
      2. said medium containing sources of assimilable carbon and nitrogen and minor organic and inorganic nutrients necessary to the growth of said microorganism,
      3. said microorganism being cultured on said nutrient medium until L-valine accumulates in said medium,
      4. said microorganism being resistant to 2-thiazolalanine, and
   b. recovering accumulated L-valine from said medium.

2. A method as set forth in claim 1, said microorganism requiring for growth in said medium at least one compound selected from the group consisting of leucine, isoleucine, threonine and methionine.

3. A method as set forth in claim 1, said microorganism being a strain of Brevibacterium lactofermentum, Corynebacterium glutamicum, or Corynebacterium acetoacidophilum.

4. A method as set forth in claim 1, wherein said microorganism is Brevibacterium lactofermentum FERMP-1845, Brevibacterium lactofermentum FERMP-1945, Brevibacterium lactofermentum FERMP-1963, Brevibacterium lactofermentum FERMP-1964, Brevibacterium lactofermentum FERMP-1965, Corynebacterium glutamicum FERMP-1768, Corynebacterium glutamicum FERMP-1966, Corynebacterium glutamicum FERMP-1967, Corynebacterium glutamicum FERMP-1968, or Corynebacterium acetoacidophilum FERMP-1314.

5. A method as set forth in claim 3, wherein said microorganism is an artificially induced mutant of a parent strain lacking significant resistance to thiazolalanine, said mutant producing extracellular valine in said medium in an amount which is more than twice the amount of valine produced in said medium by said parent strain.

* * * * *